(12) United States Patent
Ma et al.

(10) Patent No.: US 10,721,068 B2
(45) Date of Patent: *Jul. 21, 2020

(54) SECURE DATA TRANSMISSION USING NATURAL LANGUAGE

(71) Applicant: botbotbotbot Inc., Menlo Park, CA (US)

(72) Inventors: Yi Ma, Santa Clara, CA (US); Antoine Raux, Menlo Park, CA (US); Paul Yang, Palo Alto, CA (US); Felicia Wong, Menlo Park, CA (US)

(73) Assignee: BOTBOTBOTBOT INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,530

(22) Filed: Dec. 10, 2018

(65) Prior Publication Data

US 2020/0044850 A1 Feb. 6, 2020

Related U.S. Application Data

(63) Continuation of application No. 16/051,369, filed on Jul. 31, 2018, now Pat. No. 10,153,902.

(51) Int. Cl.
*H04L 9/32* (2006.01)
*G09C 1/00* (2006.01)
*G06F 40/242* (2020.01)

(52) U.S. Cl.
CPC .......... *H04L 9/3213* (2013.01); *G06F 40/242* (2020.01); *G09C 1/00* (2013.01); *H04L 9/3236* (2013.01); *H04L 2209/08* (2013.01)

(58) Field of Classification Search
CPC .................................................. H04L 19/3213
See application file for complete search history.

(56) References Cited

U.S. PATENT DOCUMENTS

| | | | | |
|---|---|---|---|---|
| 8,275,985 B1* | 9/2012 | Narayanan | ............. | G06Q 50/14 713/150 |
| 8,301,514 B1* | 10/2012 | Vippagunta | ........ | G06Q 30/0631 705/14.49 |
| 8,452,965 B1* | 5/2013 | Griffin | ................ | G06F 21/6272 713/159 |
| 10,025,941 B1* | 7/2018 | Griffin | ................ | G06F 21/6209 |

(Continued)

*Primary Examiner* — William S Powers
(74) *Attorney, Agent, or Firm* — Dentons US LLP

(57) ABSTRACT

Methods, systems, and apparatus, including computer programs encoded on computer storage media, for secure data transmission using natural language. One of the methods includes: obtaining sensitive information for a user; obtaining a natural language key for the user, wherein the natural language key for the user includes one or more natural language tokens; generating decoding data for the sensitive information for the user, wherein generating the decoding data comprises: for each place in the sensitive information for the user: assigning a respective one of the natural language tokens in the natural language key for the user to the value at the place, and generating one or more respective dummy natural language tokens for each value of the respective set of possible values for the place other than the value at the place; and providing the decoding data for use in decoding the natural language key into the sensitive information.

54 Claims, 5 Drawing Sheets

(56) References Cited

U.S. PATENT DOCUMENTS

2013/0208893 A1* 8/2013 Shablygin ............. H04L 9/0822
380/277
2014/0373101 A1* 12/2014 Mani ................... H04L 63/0807
726/4

* cited by examiner

SECURE DATA TRANSMISSION USING NATURAL LANGUAGE

BACKGROUND

This specification relates generally to secure data transmission and, more specifically, to using natural language tokens to decode sensitive information.

Systems that process user requests can require sensitive information from the user depending on the type of request. Systems that process spoken requests may require that the user speak the sensitive information in order to complete the request.

SUMMARY

This specification discloses methods for using natural language tokens to decode sensitive information. A user can provide sensitive information to a system. In addition to the sensitive information, the user can also provide the system a natural language key that is chosen by the user. The system can use the natural language key and the sensitive information to generate user-specific decoding data that can be used to decode the natural language key into the sensitive information. Once the system has generated the decoding data, the user can vocally provide the system the natural language key instead of the sensitive information. That is, when the system requires the sensitive information, the user can provide the natural language key, which the system can resolve to the sensitive information using the decoding data.

In general, one innovative aspect of the subject matter described in this disclosure can be embodied in methods that include the actions of obtaining sensitive information for a user, wherein the sensitive information for the user includes a respective value at each of one or more places, each of the one or more values selected from a respective set of possible values for the corresponding place; obtaining a natural language key for the user, wherein the natural language key for the user includes one or more natural language tokens; generating decoding data for the sensitive information for the user, wherein generating the decoding data includes: for each place in the sensitive information for the user: assigning a respective one of the natural language tokens in the natural language key for the user to the value at the place, and generating one or more respective dummy natural language tokens for each value of the respective set of possible values for the place other than the value at the place; and providing the decoding data for use in decoding the natural language key into the sensitive information.

Implementations of the method can include one or more of the following features. For example, providing can further include communicating, to a server, the decoding data for the sensitive information.

In some implementations, the natural language key for the user can be generated by the user. In other implementations, the received natural language key is spoken. In yet other implementations, the natural language tokens can include one or more of characters in a set of natural language characters or words in a dictionary of words. In some implementations, the one or more values include one or more of numeric values, natural language values, or a combination of numeric values and natural language values.

In some implementations, the method can further include receiving the natural language key for the sensitive information for the user; obtaining from a server the decoding data for the obtained sensitive information for the user; and determining the sensitive information for the user using the natural language key for the sensitive information for the user and the decoding data for the obtained sensitive information for the user.

In some implementations, the method can further include processing the obtained natural language key for the user using a hash function to generate a hashed value for the obtained natural language key; processing the received natural language key for the user using the hash function to generate a hashed value for the received natural language key; determining whether the hashed value for the obtained natural language key matches the hashed value for the received natural language key; and performing the obtaining from the server and the determining the sensitive information only when the hashed value for the obtained natural language key matches the hashed value for the received natural language key.

The sensitive information can include one or more of a number for a payment card, an expiration date for the payment card, a card verification value for the payment card, a name or username, a password, an email address, an address, or an email address.

Generating a respective dummy natural language token can include determining one or more previous natural language tokens; and generating the respective dummy natural language token based on the one or more previous natural language tokens and one or more natural language rules. The one or more previous natural language tokens can include one or more previously-generated respective dummy natural language tokens or one or more previously-assigned natural language tokens. The one or more natural language rules can include a natural language rule that requires that a combined output that includes the one or more previous natural language tokens and the respective dummy natural language token be present, at least in part, in a dictionary of words.

Generating a respective dummy natural language token can include randomly sampling, without replacement, from a set of possible natural language tokens.

In some implementations, the method can include determining that the received natural language key does not meet at least a threshold likelihood of being accurately recognized by a speech recognition engine; and in response to determining that the received natural language key does not meet at least a threshold likelihood of being accurately recognized, prompting the user to provide a replacement natural language key, to replace the received natural language key. Determining that the received natural language key does not meet at least a threshold likelihood of being accurately recognized can include determining that one or more individual tokens of the natural language key does not meet at least a threshold likelihood of being accurately recognized.

In some implementations, the method can include processing the spoken natural language key using a speaker identification engine to determine a likelihood that the spoken natural language was spoken by the user; and performing the obtaining from the server and the determining the sensitive information only when the likelihood that the spoken natural language key was spoken by the user is higher than a threshold value.

In another aspect a method includes receiving a request that (i) requires use of sensitive information for a user and (ii) that includes a natural language key for the user but does not include the sensitive information, wherein the natural language key includes a plurality of natural language tokens, and wherein the sensitive information includes a respective value at each of one or more places, each of the one or more values selected from a respective set of possible values for the corresponding place; accessing decoding data for the user, wherein, for each of the respective values at each of the one or more places in the sensitive information, the decoding data specifies a respective natural language token for each respective value; decoding the natural language key into the sensitive information, including, for each respective value at each of the one or more places in the sensitive information, mapping a corresponding natural language token in the natural language key to a value specified in the decoding data; and processing the request using the decoded sensitive information.

Among other advantages, the subject matter allows a system to, after generating the decoding data, process requests that require sensitive information without requiring a user to explicitly provide the sensitive information. This is advantageous in situations in which there is a risk of the sensitive information being overheard because the user interacts with the system using voice inputs. In particular, by using the decoding techniques described in this specification, users can speak the natural language key without revealing the sensitive information to others located nearby that can overhear the speech. By using a natural language key of the user's choosing, the key can be easy to remember for the user, i.e., even easier than memorizing the sensitive information, making it easier for the user to repeatedly provide the sensitive information to the system.

In addition, if the natural language key is compromised or if the user desires to change the natural language key for any reason, the system can respond in real-time to a user request to change the natural language key without needing to modify the sensitive information. The amount of time it takes to change the natural language key is likely shorter than the amount of time it would take to replace or regenerate the sensitive information, for example, the time it would take to receive a new payment card or social security number.

Furthermore, by using the described techniques, the system ensures that the sensitive information cannot be reconstructed even if the decoding data used to decode a user's sensitive information is compromised. That is, by using the described techniques, even if the system is hacked or the decoding data is otherwise obtained by a third-party in an unauthorized manner, the sensitive information cannot be reconstructed by the third party from the decoding data. For example, a server can store a user's unique decoding data, but not store a card verification value (CVV) of a credit card nor the natural language key that is used to decode the CVV. Therefore, if the security of the server is compromised, the CVV cannot be determined because both the decoding data and the natural language key are required to resolve the CVV.

As an additional advantage, the described techniques allow the system to use the sensitive information without storing it. In addition to being advantageous if the system's security is compromised as described above, this is also advantageous when there is a requirement that the sensitive information not be stored. For example, the Payment Card Industry Data Security Standard (PCI DSS) prohibits merchants from storing the CVV of a payment card. Therefore, by using the described techniques, the system can both use the sensitive information and comply with the PCI DDS.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings denote like components.

DETAILED DESCRIPTION

Figure 1:
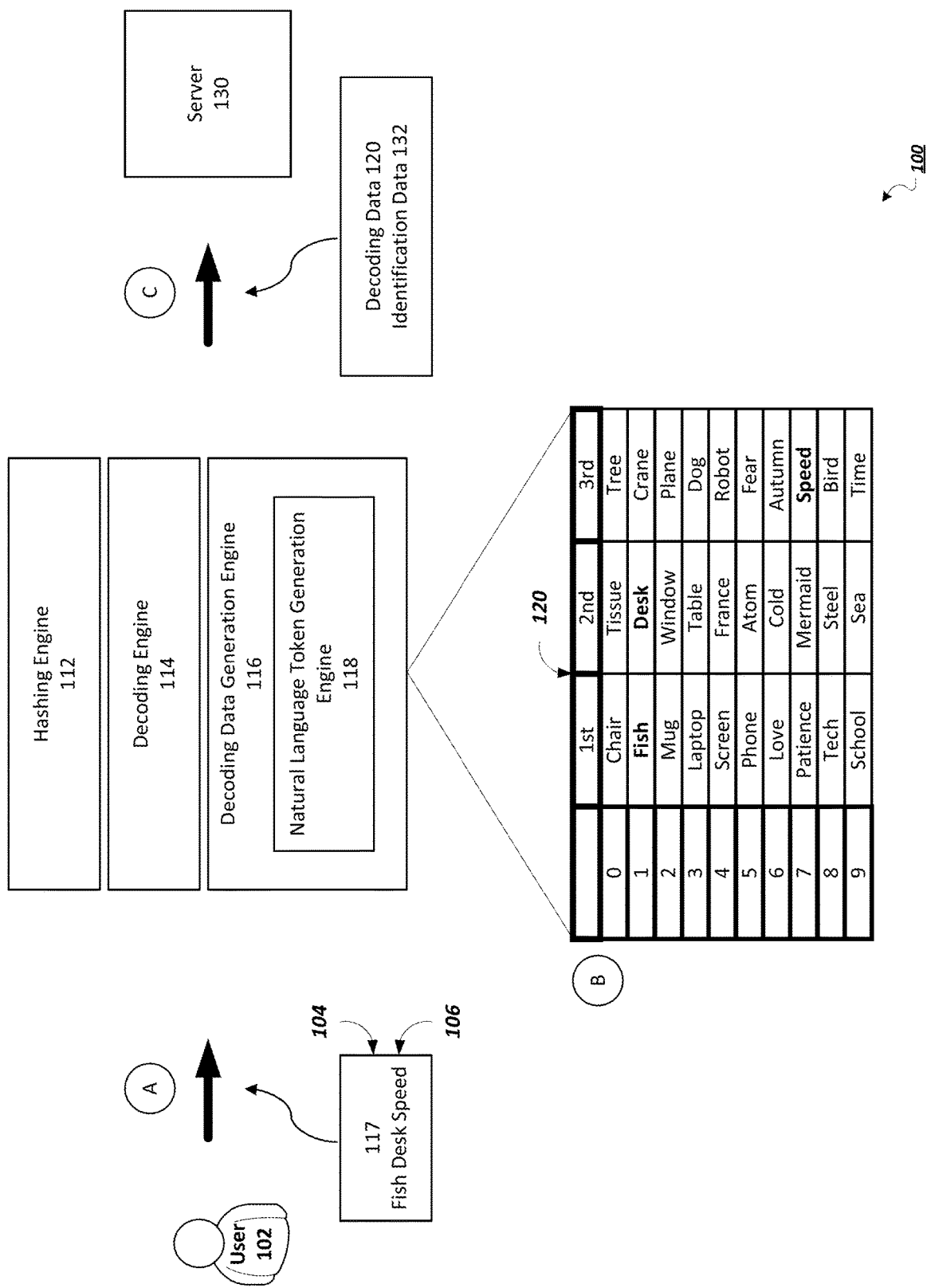
FIG. 1 is a diagram that shows an example process for generating decoding data.

Referring to FIG. 1, a system 100 includes a hashing engine 112, a decoding engine 114, a decoding data degeneration engine 116, and a natural language token generation engine 118, one or more of which can be communicatively coupled to a server 130. Stages A through C show a flow of data that results in decoding data for sensitive numeric information being generated.

FIG. 1 also shows a user 102 that provides sensitive numeric information 104 and a natural language key 106 to the decoding data generation engine 116.

The sensitive numeric information 104 can be any private numeric information. For example, the sensitive numeric information 104 can include a payment card number, e.g., a debit or credit card number, a card verification value (CVV) of a payment card, an expiration date of a payment card, a date of birth, or an identification number, e.g., a personal identification number (PIN), a social security number, or driver's license number. In the example of FIG. 1, the sensitive numeric information 104 is the number "117".

The user 102 can interact with the system 100 through a smart speaker or other smart device that can only accept audio input. For example, the smart device can receive audio input using a microphone and send the received audio input over a data communication system to the system 100.

In some implementations, the smart device can be configured to perform audio processing, e.g., automatic speech recognition, on the received audio input then send the processed audio input to the system 100. As an example, the audio processing can include identifying one or more numbers, words, or phrases in the audio input.

Instead of, or in addition to, the smart device, the user 102 can interact with the system 100 through a mobile device or other computing device that can accept audio input as well as input of other types, e.g., input entered on a keyboard of the mobile device.

The user 102 may not want to speak the sensitive numeric information 104 each time that the user desires to convey the sensitive numeric information to the server 130, due to the private nature of the information. For example, when interacting with the system 100 through a smart speaker, the user 102 is required to speak each piece of information that the user needs to convey to the system 100 and would thus need to speak the sensitive numeric information 104 each time that the user desires to convey the sensitive numeric information to the server 130.

To avoid disclosing the sensitive numeric information 104, the user 102 can create a natural language key 106 that the user can provide instead of the sensitive numeric information. The natural language key 106 can be any combination of natural language tokens, which can include characters, letters, or words. For example, a token can be the letter "A" or the word "Aardvark". In the example of FIG. 1, the natural language key 106 is the combination of words "Fish Desk Speed".

Stages A through C of FIG. 1 correspond to an enrollment process that allows the user 102 to register the natural language key 106 so that the user can later speak the natural language key in place of the sensitive numeric information 104.

In stage A of FIG. 1, the user 102 sends the sensitive numeric information 104 and the natural language key 106 to the decoding data generation engine 116. In some implementations, the system 100 prompts the user 102 to enter the sensitive numeric information 104 and the natural language key 106 using a user interface running on a computing device, e.g., on a mobile device of the user. In other implementations, the system 100 prompts the user 102 to speak the sensitive numeric information 104 and natural language key 106.

Although not shown in FIG. 1, the speech of the user 102 can be received and parsed by a speech recognizer, which can be configured to send the parsed speech to the decoding engine 114. In some implementations, when the system 100 receives the speech of the user 102, the system can also use the speech as input to the hashing engine 112 to generate a hashed value for the speech. The hashing engine is described in more detail with regard to FIG. 3A.

The decoding data generation engine 116 is configured to receive sensitive numeric information and a natural language key and generate corresponding decoding data. In stage B, the decoding data generation engine 116 receives the sensitive numeric information 104 and the natural language key 106 and generates the decoding data 120.

The decoding data 120 is a table with columns each corresponding to a place (e.g., the ones place or first place, tens place or second place, hundreds place or third place, and so on) of the sensitive numeric information 104 and rows corresponding to the values 0-9 that represent the range of possible numeric values for each place of the sensitive numeric information. For example, the sensitive numeric information 104 has three places. Reading left to right, the first, second, and third places of the sensitive numeric information 104 are "1", "1", and "7", respectively. Accordingly, the decoding data 120 has a column for each of the places. The values of the decoding table 120 are natural language tokens.

While the decoding data 120 is described as a table above, it can be implemented as any data structure that can associate natural language tokens with numeric values, e.g., as a two-dimensional array, a list of one-dimensional arrays, and so on.

The range of possible numeric values for each place is not limited to a base 10 numbering system. For example, a user can specify sensitive numeric information using a non-base 10 numbering system, e.g., binary or hexadecimal. Additionally, the decoding data generation engine 116 can generate decoding data for decoding sensitive numeric information that is specified in the non-base 10 numbering system.

The range of possible numeric values for each place can be the same or the range of possible numeric values for one or more of the places can be limited. That is, even though the possible numeric values of the base 10 numbering system are the digits 0-9, one or more of the places of the sensitive numeric information can be limited to numeric values from a range that is smaller than the range of 0-9. For example, the first place of the sensitive numeric information may be limited to the numeric values 0-4, while the second and third places may each be limited to the numeric values 5-9. The limitation may be imposed, for example, by a standard for the sensitive numeric data.

The decoding data generation engine 116 enters the natural language tokens of the natural language key 106 into the decoding data 120. In this implementation, each of the tokens of the natural language key corresponds to one of the digits of the sensitive numeric information. For example, the first natural language token of the natural language key 106 is the word "Fish", while the first digit of the sensitive numeric information 104 is the number "1". Therefore, the decoding data generation engine 116 enters the token "Fish" into the decoding data 120 at the position $(1, 1^{st})$, where the position is in the form (row, column). The decoding data generation engine 116 enters "Desk" at position $(1, 2^{nd})$ and "Speed" at position $(7, 3^{rd})$.

In addition to or instead of having multiple, distinct words as tokens, a natural language key can also have letters as tokens. Accordingly, when the tokens of the natural language key are letters, the values of the decoding data are also letters. For example, the sensitive numeric information for a user can be the number "216", while the user can choose the letters "D", "O", and "G" as a natural language key. Each of the tokens of the natural language key corresponds to one of the digits of the sensitive numeric information. The decoding data generation engine 116 would enter the token "D" into the decoding data for this natural language key at the position $(2, 1^{st})$ again, where the position is in the form (row, column). The decoding data generation engine 116 would also enter "O" at position $(1, 2^{nd})$ and "G" at position $(6, 3^{rd})$. Using letters as tokens can allow the system to more effectively encode sensitive information that has a larger quantity of numbers, i.e., because the user may only need to remember a key that includes a small number of words even if the quantity of numbers in the sensitive numeric information is large.

After entering the natural language tokens specified by the natural language key 106, the decoding data generation engine 116 enters dummy tokens in the remaining positions of the decoding data 120. The dummy tokens are chosen by the natural language token generation engine 118, which is configured to randomly sample, e.g., without replacement, each dummy natural language token from a set of possible natural language tokens for the corresponding place. The decoding data generation engine 116 enters the randomly chosen natural language tokens in the positions not occupied by the tokens of the natural language key 106. Because the decoding data is generated using a user-specific natural language key and randomly sampled natural language tokens, the decoding data is specific to the user.

Therefore, after generating the decoding data 120, the decoding data generation engine 116 has assigned each of the natural language tokens of the decoding data to a corresponding numeric value. To summarize, the decoding data generation engine 116 assigns a different natural language token of the natural language key 106 to each numeric value in the sensitive numeric information 104. Additionally, the decoding data generation engine 116 assigns a respective dummy natural language token to the remaining unassigned numeric values for each place in the sensitive numeric information 104.

In some implementations, the decoding data generation engine 116 can generate decoding data such that for each place in the sensitive numeric information, each of the possible natural language tokens maps to a respective numeric value, even when there are more possible tokens than possible numeric values for the place. In this implementation, some of the possible natural language tokens can map to the same numeric value as at least one other token. Apart from the natural language tokens specified by a natural language key that map to corresponding numeric values of the sensitive numeric data, the association of tokens to numeric values can be randomly determined as described above. In this implementation, some or all of the numeric values in the sensitive numeric data can be mapped to multiple tokens, so long as one of the multiple tokens is the corresponding token in the natural language key.

In the implementation described above, all possible natural language tokens are represented in each column of an example decoding data. That is, for decoding data that has C columns, each column corresponding to a place of sensitive numeric information, choosing one natural language token from each of the C columns allows every possible C letter combination to be made. For example, if the sensitive numeric information has three places, the corresponding decoding data can have three columns. If the possible natural language tokens are letters of the English alphabet and the possible numeric values for each place are the digits 0-9, then each column of the decoding data would include all twenty six letters in the alphabet (even though there are only ten digits), with some digits corresponding to multiple letters. Choosing one token from each of the three columns allows every 3 letter combination to be chosen, proceeding alphabetically from "AAA" to "ZZZ". Having every possible C letter combination available makes it more difficult for a malicious third-party to guess or otherwise reconstruct the natural language key that it would be for the third-party to guess the natural language key when fewer C letter combinations can be formed.

In stage C of FIG. 1, the system 100 sends information related to the generation of the decoding data to the server 130. In the example of FIG. 1, the system 100 sends the decoding data 120 and identification data 132 to the server 130. The identification data 132 can be data relevant to identifying the user 102, e.g., an identification number provided to the system 100 by the user or generated by the system for the user, a date of birth, or a username. The server 130 is configured to receive the information related to the generation of the decoding data and store the information for later access by the system 100.

In some implementations, the system 100 also sends additional numeric information for the user (i.e., in addition to the decoding data for the sensitive numeric information) to the server 130 for later use. For example, if the sensitive numeric information is a CVV of a payment card, the system 100 can send the server 130 the payment card number and/or the expiration date of the payment card for secure storage in addition to sending the decoding data for the CVV.

After generating the decoding data 120, the decoding engine 114 can use the decoding data 120 to decode the natural language key 106 to the sensitive numeric information 104 when the natural language key 106 is later spoken by the user.

In some implementations, stages A through C occur on a user device, which is configured to delete the sensitive numeric information 104 without storing it once the decoding data 120 has been generated. For example, the user device can transmit only the decoding data 120 and a user ID to the server 130 while deleting the sensitive numeric information 104 without storing the information.

In some implementations, stages A through C occur on one or more servers, e.g., the server 130. That is, once received, the user device transmits the natural language key 106 and the sensitive numeric information 104 to the server 130. Instead of storing the sensitive numeric information 104, the server 130 can generate the decoding data and then delete the sensitive numeric information 104, e.g., and only store the decoding data 120 and a user ID.

While this specification describes encoding and decoding sensitive numeric information, the techniques can also be used to encode and decode sensitive information that contains both numeric and non-numeric characters and/or information that contains only non-numeric characters, i.e., any sequence of alphanumeric and, optionally, other ASCII symbols. For example, the sensitive information can be a name, a password, an email address, an addresses, and so on. Thus, the described techniques can be used to encode any sensitive information that includes a respective value at one or more places, with the value at each place being selected from a respective set of possible values, e.g., a set of values that includes numeric values, natural language characters, alphanumeric characters, ASCII symbols, or some combination of these.

Figure 2:
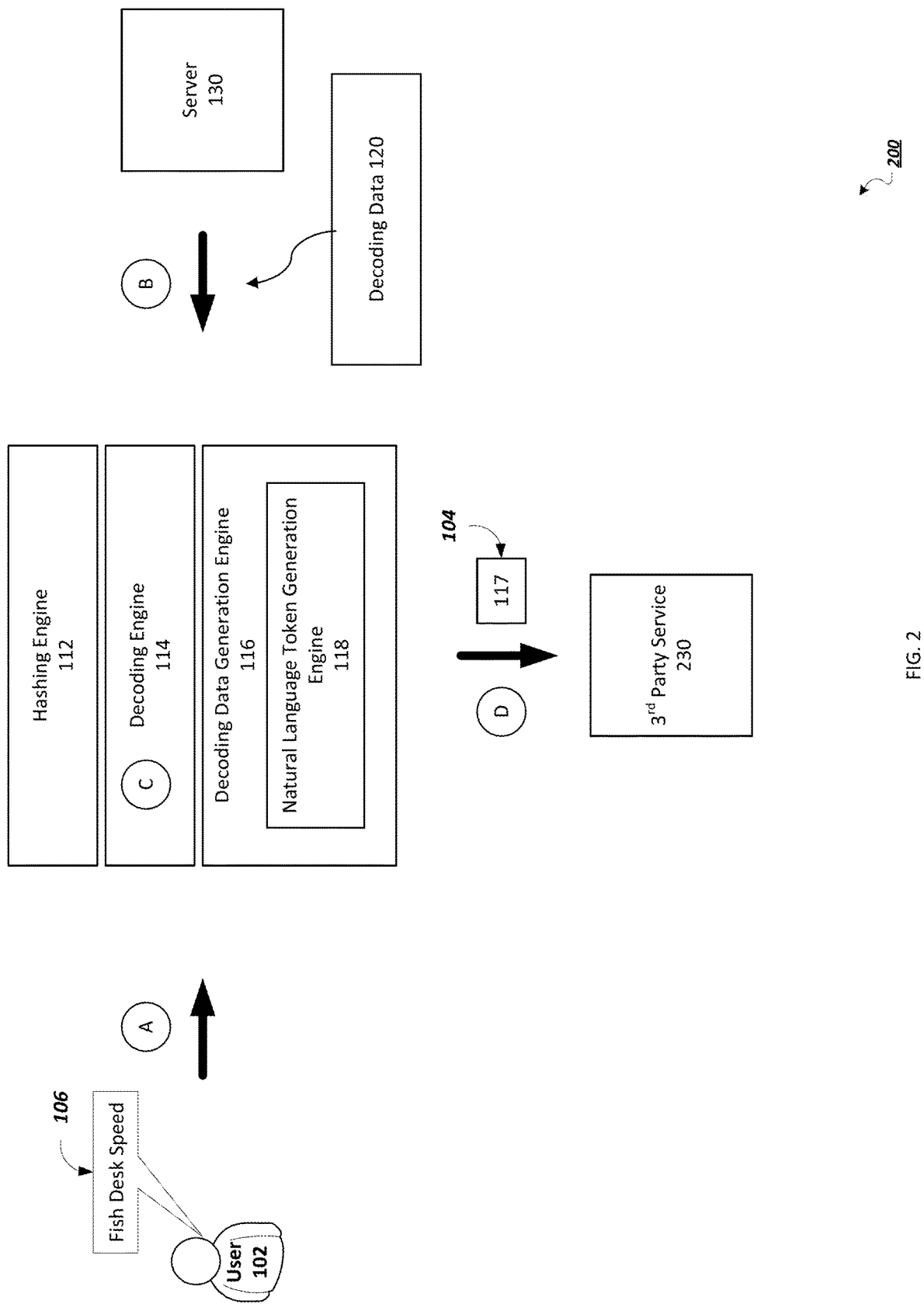
FIG. 2 is a diagram that shows an example process for decoding a natural language key of the user of FIG. 1 to sensitive numeric information.

FIG. 2 is a diagram that shows an example process for decoding the natural language key 106 of the user 102 to the sensitive numeric information 104. Stages A through D show a flow of data that results in the natural language key 106 being decoded.

Referring to FIG. 2, a system 200 includes the hashing engine 112, the decoding engine 114, the decoding data degeneration engine 116, and the natural language token generation engine 118, one or more of which can be communicatively coupled to the server 130. The system 200 also includes or communicates with a third-party service 230, which is communicatively coupled to one or more of the components of the system 200. The components of the system 200 can be implemented on one or more computers. In some implementations, the stages A through D occur on a user device, e.g., on a smart device or a mobile device. In other implementations, the stages A through D occur on one or more servers, e.g., the server 130. In yet other implementations, some of the stages can occur on the user device while other stages can occur on the one or more servers.

The third-party service 230 can be any service that requests sensitive numeric information from a user. For example, the third party service 230 can be an online vendor that uses the payment card information of a user to make a purchase or a bank that requests a PIN to access a bank account.

Stages A through D of FIG. 2 correspond to a process of decoding the natural language key 106 into the sensitive numeric information 104 and providing the sensitive numeric information for use.

In stage A of FIG. 2, the user 102 speaks the natural language key 106. That is, the microphone of the user device of the user captures audio data representing the speech of the user. When the decoding engine 114 is implemented on the user device, the decoding engine 114 processes the audio data locally to decode the natural language key 106. When the decoding engine 114 is implemented on the server 130, the user device transmits the audio data (or processed audio data, as described above) to the server 130 for use in decoding the natural language key 106.

In stage B of FIG. 2, the decoding engine 114 accesses the decoding data 120. For example, the decoding engine 114 can determine the identification data 132, unique to the user 102, and use the identification data 132 to retrieve the appropriate decoding data for the user 102. When the decoding engine 114 is implemented on the server 130, the decoding engine 114 can use the identification data 132 to access the decoding data 120 from a local memory.

When instead the decoding engine 114 is implemented on the user device, the decoding engine 114 can transmit a request to the server 130 and obtain the decoding data 120 through an encrypted connection with the server in response to the request. The server 130 allows the centralized storage of decoding data for multiple users that can be accessed by multiple user devices. The server 130 can send the decoding data to the appropriate user device. Thus, the sensitive numeric information is never transmitted over a network.

In stage C of FIG. 2, the decoding engine 114 receives the decoding data 120 and uses the decoding data and the natural language key 106 to decode the sensitive numeric information 104. That is, the decoding engine 114 uses the decoding data 120 to determine that natural language tokens "Fish", "Desk", and "Speed", as specified by the natural language key 106, correspond to the numeric values "1", "1", and "7", respectively. When the decoding engine 114 is implemented on the user device, stage C occurs on the user device as well. When instead the decoding engine 114 is implemented on the server 130, stage C occurs on the server.

After decoding the natural language key 106, the system 200 can use the sensitive numeric information 104. In stage D, the decoding engine 114 provides the decoded sensitive numeric information 104 to the third-party service 230. Although the decoding engine 114 sends the sensitive numeric information 104 to the third party service 230, the third-party service 230 does not store the sensitive numeric information. Likewise, neither the decoding engine 114 nor any other component of the system 200 stores the sensitive numeric information 104.

In the examples of FIGS. 1 and 2, the sensitive numeric information 104 is a three-digit CVV, although, alternatively, the sensitive numeric data can be a CVV with four or more digits. The third-party service can be a vendor that has access to a payment card of the user 102, but not the CVV required to make a purchase using the payment card. The decoding engine 114 can provide the CVV to the third-party service 230, e.g., over a network. The third-party service 230 can then use the CVV and payment card information to make the purchase.

In some implementations, the decoding engine 114 can receive additional sensitive data, e.g., from the server 130, and use the additional sensitive data along with the sensitive numeric information 104 instead of providing it to a third-party. For example, instead of sending the CVV to the third-party 230, the decoding engine 114 can receive the payment card information of the user 102, e.g., from the server 130, and use the CVV and payment card information to make a purchase, instead of sending sensitive data to the third-party service.

Figure 3A:
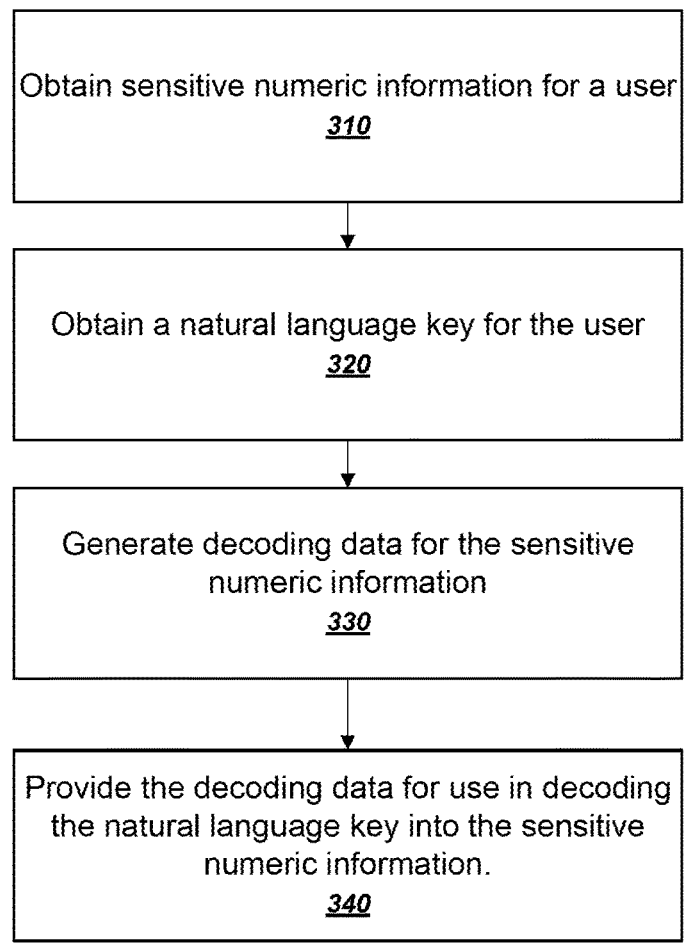
FIG. 3A is a flow diagram for an example process of providing decoding data for use in decoding a natural language key.

FIG. 3A is a flow diagram for an example process of providing decoding data for use in decoding a natural language key. For convenience, the process will be described as being performed by a system of one or more computers, located in one or more locations, and programmed appropriately in accordance with this specification.

The system obtains sensitive numeric information for a user (310). In some implementations, the system obtains the sensitive numeric information as audio input that is spoken by the user. In other implementations, the system provides a user interface through which the user can manually enter the sensitive numeric information.

The system obtains a natural language key for the user (320). Like the sensitive numeric information, the natural language key can be obtained as audio input from the user or with the use of a user interface.

The system may restrict one or more tokens from forming part of the natural language key. In some implementations, the system requires that the user choose the tokens from one or more groups. For example, the system may require that the tokens be only nouns. In some implementations, the system may restrict one or more tokens that are known to have poor speech recognition accuracy. For example, the system may restrict homophones and words that sound similar to each other from forming part of the natural language key. In some implementations, the system can determine which natural language tokens to restrict based on a prediction model that estimates the likelihood of a natural language token being accurately recognized.

In some implementations, the system can also use a prediction model that estimates the likelihood of an entire natural language key being accurately recognized by a speech recognition engine, e.g., based on the combination of the natural language tokens that form the key. If the natural language key does not meet at least a threshold likelihood of being accurately recognized, the can reject the natural language key or alert the user that the natural language key does not meet the threshold likelihood.

In some implementations, the obtained natural language key must have a one-to-one correspondence with the obtained sensitive numeric data. That is, each token of the natural language key should map to exactly one numeric value of the sensitive numeric information.

In some implementations, the system can include a hashing engine that is configured to take as input the obtained natural language key and output a hashed value for the obtained natural language key. The system can send the hashed value to a server for storage or store the hash locally.

The user can later speak the natural language key to initiate use of the sensitive numeric information. When the system receives the natural language key, the hashing engine generates a hashed value for the natural language key and verifies that the hashed value matches the hashed value previously stored by the system. If the generated hashed value matches the stored hashed value, the system can proceed to decoding the natural language key. For security, neither the system nor the server stores the natural language key.

When the system includes a hashing engine, the obtained natural language key need not have a one-to-one correspondence with the obtained sensitive numeric data. When the natural language key includes more tokens than the sensitive numeric information has numeric values, the system can use x tokens of the natural language key when generating the decoding data, where x is the number of numeric values of the sensitive numeric information. The x tokens can be chosen from predetermined positions within the natural language key 106.

The system generates decoding data for the sensitive numeric information (330). This stage is further described below with regard to FIG. 3B. The system can communicate the generated decoding data to a server, which can store the decoding data for later use by the system.

The system provides the decoding data for use in decoding the natural language key into the sensitive numeric information (340). Stage 340 is discussed with regard to FIG. 4, below.

Figure 3B:
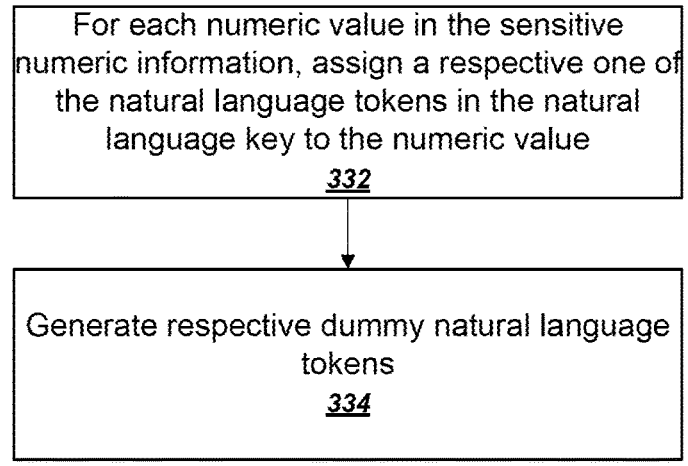
FIG. 3B is a flow diagram detailing further steps for generating decoding data for sensitive numeric information.

FIG. 3B is a flow diagram detailing further steps for generating decoding data for the sensitive numeric information (330).

For each numeric value in the sensitive numeric information, the system assigns a respective one of the natural language tokens in the natural language key to the numeric value (332). Each numeric value of the sensitive numeric information is assigned to a different one of the natural language tokens in the natural language key. In particular, the numeric value at a given place in the sensitive numeric information is assigned to the natural language token at a corresponding position in the natural language key, with each place in the numeric information having a different corresponding position.

The system generates respective dummy natural language tokens (334). The system can generate the dummy natural language tokens for the other numeric values for a given place in the sensitive information by randomly sampling, without replacement, from a group of possible natural language tokens. In some implementations, the system can also further refine the group of possible natural language tokens.

For example, the system can determine one or more previous natural language tokens. The previous natural language tokens can include a previously-generated dummy natural language token or a natural language token specified by the user and assigned to a numeric value as in stage 332. The system can then eliminate a natural language token from the group of possible natural language tokens based on whether the natural language token is one of the previous natural language tokens. For example, if the decoding data includes words, the system can ensure that the decoding data has no repeated words.

In some implementations, the system takes into account one or more natural language rules when generating the dummy natural language tokens. For example, a natural language rule can be one that requires that a combined output that includes one or more previous natural language tokens and the respective dummy natural language token be present as at least part of a word in a dictionary of words. To illustrate, when the natural language key has letters as tokens, the user can specify a word present in the dictionary of words. For example, if the natural language key is made up of the tokens "D", "O", and "G", spelling the word "dog", then "D", "O", and "G" would be placed, respectively, in a $1^{st}$, $2^{nd}$ and $3^{rd}$ column of decoding data. If an entity tried to guess the natural language key of the user knowing that the natural language key spells a dictionary word, then the entity can eliminate any letter in the $1^{st}$ column that cannot form at least part of a dictionary word when combined with a letter in the $2^{nd}$ column as well as any letter in the $2^{nd}$ column that cannot form at least part of a dictionary word when combined with a letter in the $1^{st}$ or $3^{rd}$ column, and so on. Therefore, the above mentioned natural language rule can make it more difficult to guess the natural language key by ensuring that dummy natural language tokens are chosen such that they can be combined to form a dictionary word.

In some implementations, along with generating the decoding data, the system also generates a hash of the natural language key that can later be used to verify that the user's speech represents the user speaking the natural language key. For example, the system can prompt the user to speak the natural language key and then hash the waveform representing the user's speech or audio features of the user's speech using a hashing function. As another example, in implementations in which the system is configured to perform audio processing on the audio input received from the user, the system can hash the output of the speech recognition engine, i.e., the transcription of the spoken natural language key. In some implementations, the system can prompt the user to speak the natural language key multiple times and then generate a final hash that is a combination, e.g., an average, of the individual hashes generated from the user repeatedly speaking the natural language key.

In some implementations, instead of, or in addition to, generating a hash of the natural language key, the system can process the received audio input using a speaker identification algorithm that determines a likelihood that the audio input was spoken by the user who generated the natural language key, instead of another person. After receiving the correct natural language key for the user, the system can decode the sensitive numeric information only if the algorithm indicates that the likelihood that the natural language key was spoken by the user is at least a threshold value.

In some implementations, instead of identifying numbers, words, or phrases, the audio processing can include converting the audio input into a sequence of symbols chosen from a limited number of symbols e.g., 10 or fewer symbols, 12 or fewer symbols, 15 or fewer symbols, or, more generally, from fewer symbols than would typically be included in a vocabulary of possible outputs employed by a speech recognition engine. Converting the audio input into a sequence of symbols can reduce the occurrence of false negatives, in which the user speaks the correct natural language key, but the system rejects the natural language key as being incorrect.

In implementations when the audio processing includes converting audio input into a sequence of symbols from a limited symbol set, the system can generate decoding data that maps symbols of the limited symbol set to values of the sensitive numeric information of the user. When the system receives audio input and converts the audio input into a sequence of symbols, the system can use the sequence of symbols and the decoding data to resolve the sensitive numeric information of the user.

Figure 4:
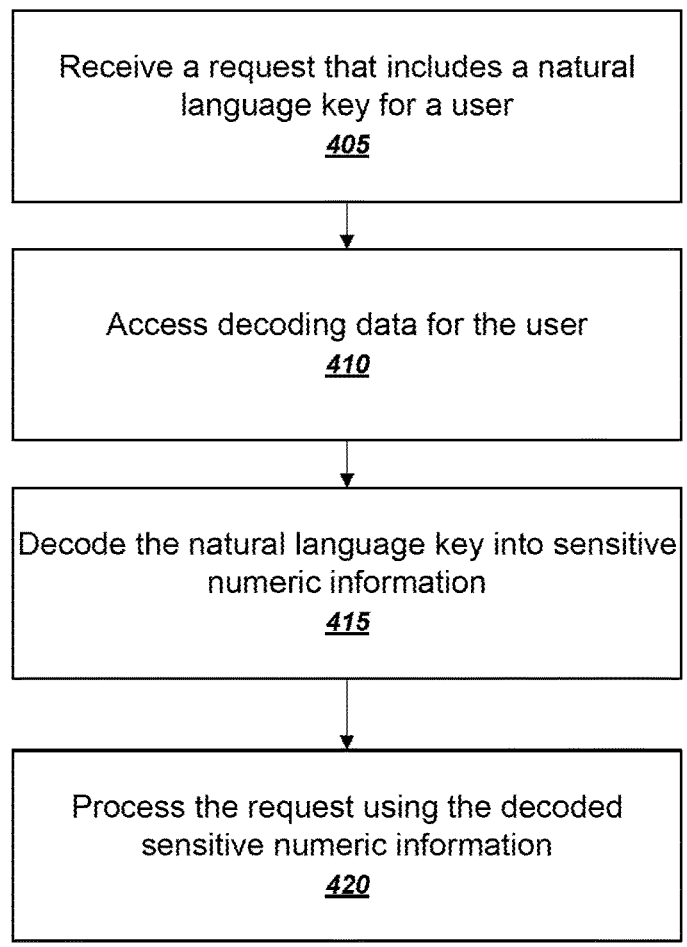
FIG. 4 is a flow diagram for an example process of processing a request that requires use of sensitive numeric information.

FIG. 4 is a flow diagram for an example process of processing a request that requires use of sensitive numeric data. For convenience, the process will be described as being performed by a system of one or more computers, located in one or more locations, and programmed appropriately in accordance with this specification.

The system receives a request that (i) requires use of sensitive numeric information for a user and (ii) that includes a natural language key for the user but does not include the sensitive numeric information (405). For example, the request can be a spoken request to access a bank account for the user, while the sensitive numeric information required to access the bank account can be a personal identification number (PIN) of the user. To avoid disclosing the PIN, the user can instead provide the natural language key.

In some implementations, the system may require the user have a unique natural language key for each third-party service that requires the use of the sensitive numeric information. For example, the system may require that a particular natural language key that the system uses for requests to access a bank account be different from the natural language that the system uses for requests to approve the purchase of an item. In this implementation, merely overhearing the natural language key, without having knowledge of which user-authorized third-party service is associated with the overheard natural language key, is not enough to compromise the sensitive numeric information.

In some implementations, the system can also use the spoken natural language key received from the user as input to the hashing function. When the system receives the natural language key, the system generates a hashed value for the natural language key and verifies that the hashed value matches the hashed value previously stored by the system for the user. If the generated hashed value matches the stored hashed value, the system can proceed to decoding the natural language key.

The system accesses decoding data for the user (410). The decoding data is generated prior to stage 410 then stored, e.g., on a server that the system can access. For example, the system can provide to the server identification information for the user. The server can use the identification information to identify the corresponding decoding data for the user, and provide the decoding data to the system.

The system decodes the natural language key into the sensitive numeric information, which includes, for each numeric value in the sensitive numeric information, mapping a corresponding natural language token in the natural language key to the numeric value specified in the decoding data (415). For example, each token of the natural language key can correspond to a numeric value of the sensitive numeric information. Given a token of the natural language key, the system can use the decoding data to determine which numeric value corresponds to the token. For example, the system can use the natural language key and the decoding data to determine the PIN of the user.

The system processes the request using the decoded sensitive numeric information (420). After decoding the natural language key into the sensitive numeric information, the system can use the sensitive numeric information to process the request. For example, the system can resolve the user's PIN and use the PIN to access the user's bank account. Therefore, the system is able to process the user's request, without requiring the user to divulge the sensitive numeric information.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A non-transitory computer-readable storage medium storing one or more programs, the one or more programs comprising instructions, which when executed by one or more processors of a first electronic device, cause the first electronic device to:
  at a first electronic device having one or more processors:
    receive a request that requires use of sensitive information for a user, wherein the sensitive information includes a respective value at each of one or more places, each of the one or more values selected from a respective set of possible values for the respective place;

receive a natural language key for the user, wherein the natural language key comprises a plurality of natural language tokens, and receive, from a second electronic device, decoding data for the user, wherein, for each of the respective values at each of the one or more places in the sensitive information, the decoding data specifies a respective natural language token for each respective value;

decode the natural language key into the sensitive information, wherein decoding the natural language key into the sensitive information comprises:

for each of the one or more places in the sensitive information, mapping a corresponding natural language token in the natural language key to the respective value specified in the decoding data for the respective natural language token; and process the request using the decoded sensitive information.

2. The non-transitory computer-readable storage medium of claim 1, wherein the one or more programs further include instructions which when executed by one or more processors of the first electronic device, cause the first electronic device to:

transmit a request to the second electronic device for the decoding data for the user.

3. The non-transitory computer-readable storage medium of claim 1, wherein the one or more programs further include instructions which when executed by one or more processors of the first electronic device, cause the first electronic device to:

determine identification data unique to the user; and access the decoding data for the user received from the second electronic device based on the identification data unique to the user.

4. The non-transitory computer-readable storage medium of claim 1, wherein the received natural language key for the user is spoken input.

5. The non-transitory computer-readable storage medium of claim 4, wherein the one or more programs further include instructions which when executed by one or more processors of the first electronic device, cause the first electronic device to:

process the spoken received natural language key for the user using a speaker identification engine to determine a likelihood that the spoken received natural language key for the user was spoken by the user;

determine whether the likelihood that the spoken received natural language key for the user was spoken by the user is higher than a threshold value; and in accordance with a determination that the spoken received natural language key for the user was spoken by the user is higher than the threshold value, perform the receiving, from a second electronic device, decoding data for the user; decoding the natural language key into the sensitive information; and processing the request.

6. The non-transitory computer-readable storage medium of claim 1, wherein the one or more programs further include instructions which when executed by one or more processors of the first electronic device, cause the first electronic device to:

receive, from a second electronic device, additional sensitive data; and wherein processing the request using the decoded sensitive information further includes using the additional sensitive data.

7. The non-transitory computer-readable storage medium of claim 1, wherein the one or more programs further include instructions which when executed by one or more processors of the first electronic device, cause the first electronic device to:

obtain a hashed value for the natural language key for the user;

determine whether the obtained hashed value for the natural language key for the user matches a stored hashed value; and in accordance with a determination that the obtained hashed value for the natural language key for the user matches the stored hashed value, perform the receiving, from a second electronic device, decoding data for the user; decoding the natural language key into the sensitive information;

and processing the request.

8. The non-transitory computer-readable storage medium of claim 1, wherein the request that requires use of sensitive information for a user is received from a third-party service.

9. The non-transitory computer-readable storage medium of claim 8, wherein the received natural language key is unique to the third-party service.

10. The non-transitory computer-readable storage medium of claim 1, wherein the request that requires use of sensitive information for a user is received from the user.

11. The non-transitory computer-readable storage medium of claim 1, wherein the decoding data further specifies, for each of the one or more places in the sensitive information, a respective dummy natural language token for each value of the respective set of possible values for the respective place not included in the sensitive information.

12. The non-transitory computer-readable storage medium of claim 11, wherein each respective dummy natural language token is generated based on one or more previous natural language tokens.

13. The non-transitory computer-readable storage medium of claim 11, wherein each respective dummy natural language token is generated based on one or more natural-language rules.

14. The non-transitory computer-readable storage medium of claim 11, wherein each respective dummy natural language token is randomly sampled from a set of possible natural language tokens for the respective place.

15. The non-transitory computer-readable storage medium of claim 1, wherein the natural language key is generated by the user.

16. The non-transitory computer-readable storage medium of claim 1,
wherein the natural language key was previously validated as meeting a threshold likelihood of being accurately recognized.

17. The non-transitory computer-readable storage medium of claim 1,
wherein the one or more values include one or more of numeric values, natural language values, or a combination of numeric values and natural language values.

18. The non-transitory computer-readable storage medium of claim 1,
wherein the sensitive information can include one or more of a number for a payment card, an expiration date for the payment card, a card verification value for the payment card, a name, a username, a password, an email address, an address, a date of birth, or an identification number.

19. A first electronic device, comprising:
one or more processors;
a memory; and
one or more programs, wherein the one or more programs are stored in the memory and configured to be executed by the one or more processors, the one or more programs including instructions for:
receiving a request that requires use of sensitive information for a user, wherein the sensitive information includes a respective value at each of one or more places, each of the one or more values selected from a respective set of possible values for the respective place;
receiving a natural language key for the user, wherein the natural language key comprises a plurality of natural language tokens, and
receiving, from a second electronic device, decoding data for the user, wherein, for each of the respective values at each of the one or more places in the sensitive information, the decoding data specifies a respective natural language token for each respective value;
decoding the natural language key into the sensitive information, wherein decoding the natural language key into the sensitive information comprises:
for each of the one or more places in the sensitive information, mapping a corresponding natural language token in the natural language key to the respective value specified in the decoding data for the respective natural language token; and
processing the request using the decoded sensitive information.

20. The electronic device of claim 19, wherein the one or more programs further include instructions for:
transmitting a request to the second electronic device for the decoding data for the user.

21. The electronic device of claim 19, wherein the one or more programs further include instructions for:
determining identification data unique to the user; and
accessing the decoding data for the user received from the second electronic device based on the identification data unique to the user.

22. The electronic device of claim 19, wherein the received natural language key for the user is spoken input.

23. The electronic device of claim 22, wherein the one or more programs further include instructions for:
processing the spoken received natural language key for the user using a speaker identification engine to determine a likelihood that the spoken received natural language key for the user was spoken by the user;
determining whether the likelihood that the spoken received natural language key for the user was spoken by the user is higher than a threshold value; and
in accordance with a determination that the spoken received natural language key for the user was spoken by the user is higher than the threshold value, performing the receiving, from a second electronic device, decoding data for the user; decoding the natural language key into the sensitive information; and processing the request.

24. The electronic device of claim 19, wherein the one or more programs further include instructions for:
receiving, from a second electronic device, additional sensitive data; and
wherein processing the request using the decoded sensitive information further includes using the additional sensitive data.

25. The electronic device of claim 19 wherein the one or more programs further include instructions for:
obtaining a hashed value for the natural language key for the user;
determining whether the obtained hashed value for the natural language key for the user matches a stored hashed value; and
in accordance with a determination that the obtained hashed value for the natural language key for the user matches the stored hashed value, performing the receiving, from a second electronic device, decoding data for the user; decoding the natural language key into the sensitive information; and processing the request.

26. The electronic device of claim 19 wherein the request that requires use of sensitive information for a user is received from a third-party service.

27. The electronic device of claim 21, wherein the received natural language key is unique to the third-party service.

28. The electronic device of claim 19, wherein the request that requires use of sensitive information for a user is received from the user.

29. The electronic device of claim 19, wherein the decoding data further specifies, for each of the one or more places in the sensitive information, a respective dummy natural language token for each value of the respective set of possible values for the respective place not included in the sensitive information.

30. The electronic device of claim 29, wherein each respective dummy natural language token is generated based on one or more previous natural language tokens.

31. The electronic device of claim 29, wherein each respective dummy natural language token is generated based on one or more natural-language rules.

32. The electronic device of claim 29, wherein each respective dummy natural language token is randomly sampled from a set of possible natural language tokens for the respective place.

33. The electronic device of claim 19, wherein the natural language key is generated by the user.

34. The electronic device of claim 19, wherein the natural language key was previously validated as meeting a threshold likelihood of being accurately recognized.

35. The electronic device of claim 19, wherein the one or more values include one or more of numeric values, natural language values, or a combination of numeric values and natural language values.

36. The electronic device of claim 19, wherein the sensitive information can include one or more of a number for a payment card, an expiration date for the payment card, a card verification value for the payment card, a name, a username, a password, an email address, an address, a date of birth, or an identification number.

37. A method comprising:
at a first electronic device having one or more processors:
receiving a request that requires use of sensitive information for a user, wherein the sensitive information includes a respective value at each of one or more places, each of the one or more values selected from a respective set of possible values for the respective place;
receiving a natural language key for the user, wherein the natural language key comprises a plurality of natural language tokens, and
receiving, from a second electronic device, decoding data for the user, wherein, for each of the respective values at each of the one or more places in the sensitive information, the decoding data specifies a respective natural language token for each respective value;
decoding the natural language key into the sensitive information, wherein decoding the natural language key into the sensitive information comprises:
for each of the one or more places in the sensitive information, mapping a corresponding natural language token in the natural language key to the respective value specified in the decoding data for the respective natural language token; and
processing the request using the decoded sensitive information.

38. The method of claim 37, further comprising:
transmitting a request to the second electronic device for the decoding data for the user.

39. The method of claim 37, further comprising:
determining identification data unique to the user; and
accessing the decoding data for the user received from the second electronic device based on the identification data unique to the user.

40. The method of claim 37, wherein the received natural language key for the user is spoken input.

41. The method of claim 40, further comprising:
processing the spoken received natural language key for the user using a speaker identification engine to determine a likelihood that the spoken received natural language key for the user was spoken by the user;
determining whether the likelihood that the spoken received natural language key for the user was spoken by the user is higher than a threshold value; and
in accordance with a determination that the spoken received natural language key for the user was spoken by the user is higher than the threshold value, performing the receiving, from a second electronic device, decoding data for the user; decoding the natural language key into the sensitive information; and processing the request.

42. The method of claim 37, further comprising:
receiving, from a second electronic device, additional sensitive data; and
wherein processing the request using the decoded sensitive information further includes using the additional sensitive data.

43. The method of claim 37, further comprising:
obtaining a hashed value for the natural language key for the user;
determining whether the obtained hashed value for the natural language key for the user matches a stored hashed value; and
in accordance with a determination that the obtained hashed value for the natural language key for the user matches the stored hashed value, performing the receiving, from a second electronic device, decoding data for the user; decoding the natural language key into the sensitive information; and processing the request.

44. The method of claim 37 wherein the request that requires use of sensitive information for a user is received from a third-party service.

45. The method of claim 44, wherein the received natural language key is unique to the third-party service.

46. The method of claim 37, wherein the request that requires use of sensitive information for a user is received from the user.

47. The method of claim 37, wherein the decoding data further specifies, for each of the one or more places in the sensitive information, a respective dummy natural language token for each value of the respective set of possible values for the respective place not included in the sensitive information.

48. The method of claim 47, wherein each respective dummy natural language token is generated based on one or more previous natural language tokens.

49. The method of claim 47, wherein each respective dummy natural language token is generated based on one or more natural-language rules.

50. The method of claim 47, wherein each respective dummy natural language token is randomly sampled from a set of possible natural language tokens for the respective place.

51. The method of claim 37, wherein the natural language key is generated by the user.

52. The method of claim 37, wherein the natural language key was previously validated as meeting a threshold likelihood of being accurately recognized.

53. The method of claim 37, wherein the one or more values include one or more of numeric values, natural language values, or a combination of numeric values and natural language values.

54. The method of claim 37, wherein the sensitive information can include one or more of a number for a payment card, an expiration date for the payment card, a card verification value for the payment card, a name, a username, a password, an email address, an address, a date of birth, or an identification number.

* * * * *